US008318357B2

(12) United States Patent
Sugaya et al.

(10) Patent No.: US 8,318,357 B2
(45) Date of Patent: Nov. 27, 2012

(54) POSITIVE ELECTRODE ACTIVE MATERIAL FOR NON-AQUEOUS ELECTROLYTE SECONDARY BATTERY, POSITIVE ELECTRODE FOR NON-AQUEOUS ELECTROLYTE SECONDARY BATTERY AND NON-AQUEOUS ELECTROLYTE SECONDARY BATTERY

(75) Inventors: Junichi Sugaya, Osaka (JP); Tetsuo Nanno, Osaka (JP); Hiroshi Yoshizawa, Osaka (JP)

(73) Assignee: Panasonic Corporation, Osaka (JP)

( * ) Notice: Subject to any disclaimer, the term of this patent is extended or adjusted under 35 U.S.C. 154(b) by 168 days.

(21) Appl. No.: 12/811,307

(22) PCT Filed: May 13, 2009

(86) PCT No.: PCT/JP2009/002087
§ 371 (c)(1),
(2), (4) Date: Jun. 30, 2010

(87) PCT Pub. No.: WO2009/139157
PCT Pub. Date: Nov. 19, 2009

(65) Prior Publication Data
US 2010/0276217 A1     Nov. 4, 2010

(30) Foreign Application Priority Data

May 15, 2008  (JP) ................. 2008-128014

(51) Int. Cl.
*H01M 4/13* (2010.01)
*H01M 4/58* (2010.01)
*H01M 4/88* (2006.01)
*B60K 1/00* (2006.01)
*G01F 3/24* (2006.01)
*C01D 1/02* (2006.01)

(52) U.S. Cl. ............... 429/231.95; 429/209; 429/218.1; 429/220; 429/221; 429/223; 429/224; 429/231.5; 429/231.9; 180/65.1; 252/182.1; 73/217; 423/594.4

(58) Field of Classification Search .............. 429/209, 429/218.1, 220, 221, 223, 224, 231.5, 231.9, 429/231.95; 252/182.1; 180/65.1; 173/217; 423/594.4
See application file for complete search history.

(56) References Cited

U.S. PATENT DOCUMENTS

| 6,274,270 B1 * | 8/2001 | Audry et al. .............. 429/223 |
| 7,112,387 B2 * | 9/2006 | Kimoto et al. .............. 429/99 |
| 7,998,620 B2 * | 8/2011 | Nanno ................. 429/231.1 |
| 2003/0089511 A1 * | 5/2003 | Tsuneda et al. ............ 173/217 |
| 2007/0082265 A1 * | 4/2007 | Itou et al. ................. 429/223 |
| 2007/0202405 A1 | 8/2007 | Shizuka et al. |

FOREIGN PATENT DOCUMENTS

EP    2 139 058 A1    12/2009

(Continued)

*Primary Examiner* — Carlos Barcena
(74) *Attorney, Agent, or Firm* — McDermott Will & Emery LLP

(57) ABSTRACT

Disclosed is a secondary battery with a non-aqueous electrolyte that has excellent cycle characteristics and output characteristics. Also disclosed is a positive electrode active material for a secondary battery with a non-aqueous electrolyte that includes a powder of a volume resistivity of 20 Ω·cm or more and 100 Ω·cm or less when said powder has a bulk density of 3 g/cm³. The use of the lithium nickel composite oxide as a positive electrode active material can provide a secondary battery with a non-aqueous electrolyte that has excellent cycle characteristics and output characteristics.

8 Claims, 3 Drawing Sheets

FOREIGN PATENT DOCUMENTS

| | | |
|---|---|---|
| JP | 2003-086179 | 3/2003 |
| JP | 2005-100922 | 4/2005 |
| JP | 2005-340186 | 12/2005 |
| JP | 2006-024486 | 1/2006 |
| JP | 2009-032681 | 2/2009 |
| WO | WO 2008/081839 A1 | 7/2008 |
| WO | WO 2009/001557 A1 | 12/2008 |

* cited by examiner

POSITIVE ELECTRODE ACTIVE MATERIAL FOR NON-AQUEOUS ELECTROLYTE SECONDARY BATTERY, POSITIVE ELECTRODE FOR NON-AQUEOUS ELECTROLYTE SECONDARY BATTERY AND NON-AQUEOUS ELECTROLYTE SECONDARY BATTERY

RELATED APPLICATIONS

This application is the U.S. National Phase under 35 U.S.C. §371 of International Application No. PCT/JP2009/002087, filed on May 13, 2009, which in turn claims the benefit of Japanese Application No. 2008-128014, filed on May 15, 2008, the disclosures of which applications are incorporated by reference herein.

TECHNICAL FIELD

The present invention relates to a non-aqueous electrolyte secondary battery, and specifically relates to an improvement of a positive electrode active material for a non-aqueous electrolyte secondary battery.

In recent years, with the rapid growth of portable and cordless electronic devices, there has been an increasing demand for small-sized and lightweight secondary batteries having a high energy density as a power source for driving these devices. Technical development of secondary batteries has been accelerated not only for small-sized consumer products but also for secondary batteries of a large size that are suitable for uses requiring durability for a long period of time and safety, such as a power source for energy storage and a power source for driving electric vehicles.

BACKGROUND ART

The non-aqueous electrolyte secondary batteries include a positive electrode, a negative electrode, a separator interposed between the positive and negative electrodes, and a non-aqueous electrolyte. In recent years, in the non-aqueous electrolyte secondary batteries that have been put into practical use, a microporous film mainly composed of polyolefin is used as the separator, and a non-aqueous electrolyte prepared by dissolving a lithium salt such as $LiBF_4$ and $LiPF_6$ in a nonprotic non-aqueous solvent is generally used as the non-aqueous electrolyte. As a positive electrode active material, lithium cobalt oxides (e.g. $LiCoO_2$) that have a high electric potential versus lithium and a superior safety, and that can be relatively readily synthesized are used; as a negative electrode active material, a variety of carbon materials such as graphite are used.

Under such circumstances, regarding the positive electrode active material, from the viewpoint of realizing a higher capacity, attempts have been made actively to put lithium nickel oxides (e.g. $LiNiO_2$) into practical use. In particular, lithium nickel oxides are expected to be developed into uses requiring durability for a long period of time and reliability.

However, the non-aqueous electrolyte secondary batteries using conventional lithium nickel oxides as the positive electrode active material have a problem, for example, of a decrease of output characteristics owing to an increase of an internal impedance. Suppression of the increase of the internal impedance is a particularly important problem in uses requiring a high output.

Therefore, with the aim of improving output characteristics, Patent Literature 1 proposes composite oxides of lithium-nickel-manganese-cobalt based having a volume resistivity of $5 \times 10^5$ Ω·cm or less when compressed at a pressure of 40 MPa, and a ratio (C/S value) of concentration of contained carbon C (% by weight) relative to BET specific surface area S ($m^2/g$) of 0.25 or less. In this literature, first a nickel compound, a manganese compound, and a cobalt compound are pulverized in a liquid medium into an average particle diameter of 0.3 μm, thereby to prepare an uniformly dispersed slurry. Next, this slurry is sprayed and dried to form secondary particles in which primary particles are aggregated. Thereafter, the secondary particles and a lithium compound are sufficiently mixed and the obtained mixture is baked in an atmosphere of a gas containing oxygen.

CITATION LIST

Patent Literature

[PTL 1] Japanese Laid-Open Patent Publication 2005-340186

SUMMARY OF INVENTION

Technical Problem

However, even with the technique proposed in Patent Literature 1, the volume resistivity of the lithium nickel composite oxide is about $5 \times 10^5$ to $1 \times 10^3$ Ω·cm, which is not sufficient from the viewpoint of obtaining a high output.

The present invention has an object to provide a positive electrode active material for a non-aqueous electrolyte secondary battery having an extremely low volume resistivity, and a non-aqueous electrolyte secondary battery exhibiting a high output.

Solution to Problem

In order to solve the problem described above, a positive electrode active material for a non-aqueous electrolyte secondary battery of the present invention includes a powder of a lithium nickel composite oxide, and when the bulk density of this powder is 3 g/cm³, the volume resistivity is 20 Ω·cm or more and 100 Ω·cm or less.

The above lithium nickel composite oxide can suppress the volume resistivity to a low value even when the bulk density of this powder is set to the relatively low value as above. Consequently, an extremely high output can be obtained by using this lithium nickel composite oxide as the positive electrode active material.

In the positive electrode active material for a non-aqueous electrolyte secondary battery of the present invention, it is preferable that the above lithium nickel composite oxide has a layered structure and a hexagonal structure. Also, the composition thereof is preferably represented by the general formula: $Li_{1-x}Na_xNi_{1-y}Me_yO_2$, wherein Me is at least one element selected from the group consisting of Co, Mn, Fe, Cu, Al, Mg, Ti, Zr, Ce, and Y, $0<x\leq0.05$, and $0\leq y\leq0.34$. When the lithium nickel composite oxide has the composition represented by the above general formula, the effect of the present invention of decreasing the volume resistivity is exhibited more distinctively.

In the positive electrode active material for a non-aqueous electrolyte secondary battery of the present invention, from a viewpoint of further lowering the volume resistivity thereof, it is preferable that the above lithium nickel composite oxide satisfies at least one of the following (i) to (iv):

(i) having primary particles in the shape of a polygonal plate;

(ii) not forming substantially secondary particles;

(iii) having primary particles with a median diameter in the range of 3 μm or more and 13 μm or less; and (iv) having a BET specific surface area in the range of 0.3 $m^2/g$ or more and 0.8 $m^2/g$ or less.

In the present invention, a "primary particle" means a particle consisting of a single crystallite (crystal particle). Therefore, a grain boundary is not present in the primary particle. Also, a secondary particle is a particle formed of a plurality of aggregated primary particles.

A method for producing the positive electrode active material for a non-aqueous electrolyte secondary battery of the present invention includes an ion exchange step of mixing a sodium nickel composite oxide including primary particles having a median diameter of 8 μm or more and 13 μm or less with a molten salt containing lithium and heat treating the obtained mixture so that sodium ions of the sodium nickel composite oxide are exchanged with lithium ions of the molten salt, and a baking step of heating and baking the mixture after the ion exchange step so that a powder of a lithium nickel composite oxide is formed. In the ion exchange step, the temperature of the mixture is maintained at 400° C. or less, and in the baking step, the mixture after the ion exchange step is heated at 600° C. or more and 800° C. or less.

According to the above production method, when the bulk density of the powder is set to 3 $g/cm^3$, the volume resistivity of the powder of the lithium nickel composite oxide can be decreased to 20 to 100 Ω·cm. Consequently, according to the above production method, a lithium nickel composite oxide suitable for providing a non-aqueous electrolyte secondary battery having a high output can be produced.

In the method for producing a positive electrode active material for a non-aqueous electrolyte secondary battery, from the viewpoint of decreasing the volume resistivity of the powder of the lithium nickel composite oxide, it is preferable that any one of the conditions (a) to (c) as follows is satisfied:

(a) as the sodium nickel composite oxide, a mixture of nickel composite oxide and a sodium compound baked at 750° C. or more and 850° C. or less is used;

(b) the ion exchange step is carried out in an atmosphere with a dew point of −20° C. or less;

(c) in the ion exchange step, the molten salt is used excessively such that the amount of lithium in the molten salt is, in a molar ratio, at least three times as much as the amount of sodium in the sodium nickel composite oxide.

Further, in the method for producing a positive electrode active material for a non-aqueous electrolyte secondary battery of the present invention, after the baking step, it is preferable to wash with water a reaction product obtained by baking and drying the same in vacuum at 150° C. or more and 300° C. or less.

A positive electrode plate for a non-aqueous secondary battery of the present invention includes a positive electrode current collector, a positive electrode active material layer formed on a surface of the positive electrode current collector, wherein the positive electrode active material layer includes the lithium nickel composite oxide of the present invention. Since this positive electrode plate includes the lithium nickel composite oxide of the present invention as the positive electrode active material, an increase of the internal impedance can be suppressed. Therefore, it is suitable for uses requiring a high output.

A non-aqueous electrolyte secondary battery of the present invention comprises: an electrode group including the positive electrode plate of the present invention, a negative electrode plate containing a negative electrode active material capable of absorbing and desorbing lithium, and a separator separating the positive electrode plate and the negative electrode plate; a non-aqueous electrolyte; and a battery case for housing the electrode group and the non-aqueous electrolyte. In this non-aqueous electrolyte secondary battery, since the positive electrode for a non-aqueous electrolyte secondary battery of the present invention is used as the positive electrode, an increase in the internal impedance can be suppressed, and therefore a high output can be achieved.

Since the non-aqueous electrolyte secondary battery has a high output as described above, it is suitable, for example, for uses such as a power source for an electric motor for diving battery-type electric vehicles, and as a power source for driving an electric motor for driving electric tools.

A battery-type electric vehicles of the present invention includes a vehicle and a prime mover for driving the vehicle, wherein the prime mover includes at least an electric motor driven by a secondary battery, and the second battery includes the non-aqueous electrolyte secondary battery of the present invention.

An electric tool of the present invention includes a driven portion and a electric motor for driving the driven portion that is driven by at least a secondary battery, wherein the secondary battery includes the non-aqueous secondary battery of the present invention.

Effect of Invention

The lithium nickel composite oxide forming the positive electrode active material for a non-aqueous electrolyte secondary battery of the present invention exhibits an extremely low volume resistivity of 20 Ω·cm or more and 100 Ω·cm or less even when the bulk density thereof shows a relatively low value of 3 $g/cm^3$. Therefore, a non-aqueous electrolyte secondary battery exhibiting excellent cycle characteristics and output characteristics can be provided by using the lithium nickel composite oxide as the positive electrode active material in the non-aqueous electrolyte secondary battery.

DESCRIPTION OF EMBODIMENT(S)

A positive electrode active material for a non-aqueous electrolyte secondary battery of the present invention comprises a powder of a lithium nickel composite oxide, and has a volume resistivity of 20 Ω·cm or more and 100 Ω·cm or less when the bulk density of this powder is 3 $g/cm^3$. By using this positive electrode active material, a non-aqueous electrolyte secondary battery having excellent cycle characteristics and output characteristics can be obtained. The reason for this is considered as follows.

As described above, the lithium nickel composite oxide in the positive electrode active material for a non-aqueous electrolyte secondary battery of the present invention (may be simply referred to as the lithium nickel composite oxide of the present invention) shows a volume resistivity of the powder of 20 Ω·cm or more and 100 Ω·cm or less, which is an extremely low value, even when the bulk density of the powder shows a low value of 3 g/cm$^3$. In consequence, even in the case where a material having a high porosity is used as the positive electrode current collector plate and the active material is arranged sparsely on the surface of the positive electrode current collector plate, the electrode plate resistance of the positive electrode can be reduced to a low value by using the lithium nickel composite oxide as the positive electrode active material. Moreover, since the permeability of the non-aqueous electrolyte to the inside of the positive electrode becomes favorable when the porosity of the positive electrode current collector plate is high, the reaction between the positive electrode active material and the non-aqueous electrolyte can progress smoothly, and as a result, the cycle characteristics and the output characteristics are considered to be improved.

Figure 1:
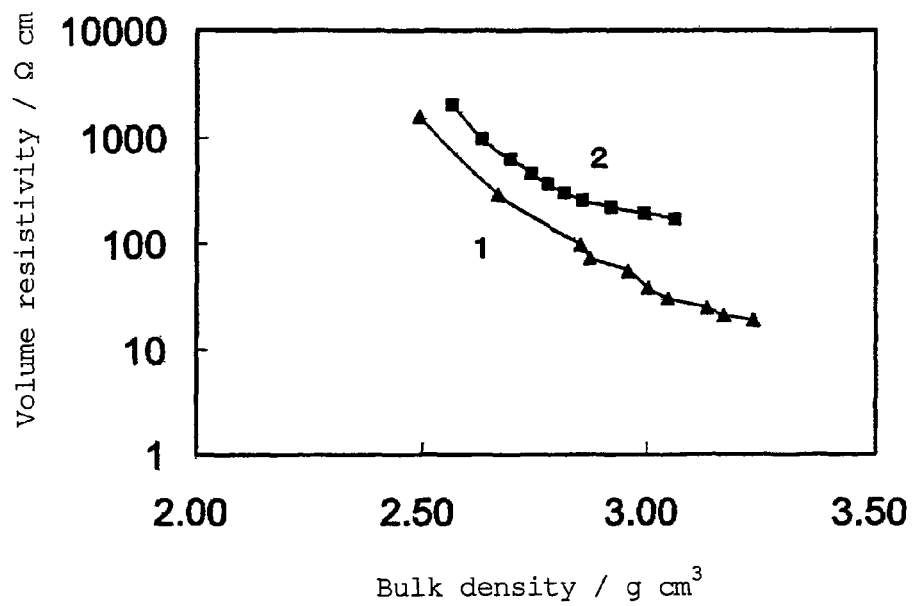
[FIG. 1] A graph showing measurement results of volume resistivity with regard to a lithium nickel composite oxide powder of Example 1 and a lithium nickel composite oxide powder of Comparative Example 1.

FIG. 1 is a graph comparing measurement results of the powder of the lithium nickel composite oxide of the present invention and a powder of a conventional lithium nickel composite oxide synthesized by a solid phase method. In FIG. 1, the volume resistivity represented by numeral "1" is a data about a powder of a lithium nickel composite oxide ($Li_{0.98}Na_{0.02}Ni_{0.81}Co_{0.16}Al_{0.03}O_2$, median diameter of primary particle: about 10 μm) obtained in Example 1 described below; and the volume resistivity represented by numeral "2" is a data about a powder of a lithium nickel composite oxide ($LiNi_{0.81}Co_{0.16}Al_{0.03}O_2$, median diameter of primary particle: about 1 μm, median diameter of secondary particle: about 13 μm) obtained in Comparative Example 1 described below.

As explicit from FIG. 1, the lithium nickel composite oxide of the present invention had a low volume resistivity as compared to the conventional lithium nickel composite oxide. Specifically, the volume resistivity when the bulk density of the powder was 3 g/cm$^3$ was 38 Ω·cm in the lithium nickel composite oxide of the present invention, whereas it was 190 Ω·cm in the conventional lithium nickel composite oxide.

In the present invention, the composition of the lithium nickel composite oxide is preferably represented by the general formula: $Li_{1-x}Na_xNi_{1-y}Me_yO_2$.

In the above general formula, x shows an atomic ratio of sodium (Na) and exceeds 0 and 0.05 or less, preferably 0.005 or more and 0.03 or less. When the value x exceeds than the above range, there is a possibility that sodium ions are extracted from the positive electrode during the charge and that the extracted sodium ions are absorbed in the negative electrode. Moreover, there is a possibility that a compound having a high reactivity with the non-aqueous electrolyte is generated consequently. Also, the compound thus generated reacts with the non-aqueous electrolyte during the charge and discharge to produce byproducts, and these byproducts may possibly become a cause for decreasing the charge and discharge capacity of the secondary battery. Therefore, when the value x exceeds 0.05, the charge and discharge capacity of the battery may be decreased.

Herein, (1−x) represents an atomic ratio of lithium (Li) and is 0.95 or more and 1 or less, preferably 0.97 or more and 0.995 or less.

In the above general formula, the element corresponding to Me is at least one element selected from the group consisting of cobalt (Co), manganese (Mn), iron (Fe), copper (Cu), aluminum (Al), magnesium (Mg), titanium (Ti), zirconium (Zr), cerium (Ce), and Yttrium (Y). y represents an atomic ratio of the element Me and is 0 or more and 0.34 or less, preferably 0.15 or more and 0.25 or less. When the value y exceeds the above range, there is a possibility that the charge-discharge capacity decreases.

In order to set the volume resistivity of the lithium nickel composite oxide to the range of the present invention, for example the particle shape of the lithium nickel composite oxide needs to be controlled appropriately.

Figure 2:
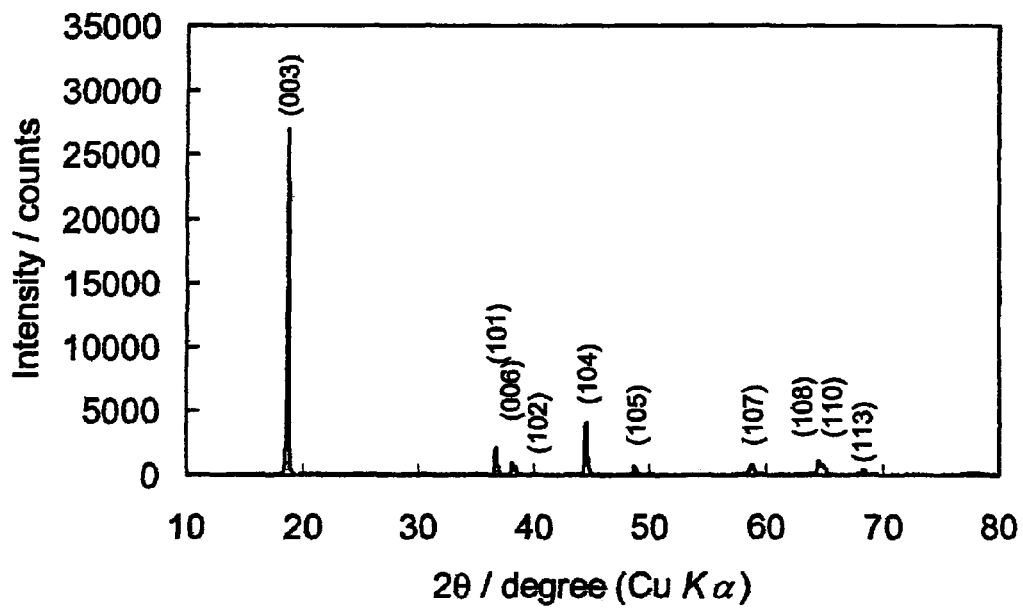
[FIG. 2] A chart showing results of an X-ray diffraction analysis with regard to the lithium nickel composite oxide of Example 1.

For example, it is preferable that the lithium nickel composite oxide has a primary particle in the shape of a polygonal plate. FIG. 2 is a chart showing results of an X-ray diffraction analysis about the lithium nickel composite oxide of the present invention, and shows specifically the results of an X-ray diffraction analysis about the lithium nickel composite oxide obtained in Example 1 as described below. As FIG. 2 shows, the lithium nickel composite oxide of the present invention is oriented largely to (003), and is found to have shape of a polygonal plate where a-b face of the particle has grown largely. In the case where lithium nickel composite oxide has such a shape of a polygonal plate, when the positive electrode including this lithium nickel composite oxide as the positive electrode active material is pressed, the positive electrode active materials are stuck on the above a-b face, and therefore a contact surface between each of the positive electrode active materials is increased. In consequence, it is considered that the volume resistivity of the positive electrode active material can be lowered even when the bulk density of the positive electrode active material is low.

It is preferable that the lithium nickel composite oxide is substantially formed into primary particles, that is, exists as primary particles without forming secondary particles. Also, it is preferable that the lithium nickel composite oxide is formed into secondary particles as little as possible. Even when it includes secondary particles, the content ratio thereof is preferably 5% by weight or less, and more preferably 1% by weight or less relative to the total of the lithium nickel composite oxide.

The median diameter of the primary particles is preferably 3 μm or more, and more preferably 8 μm or more. When the median diameter of the primary particles is below the above range, the primary particles readily aggregate to form secondary particles. The positive electrode active material repeats expansion and contraction along with absorption and desorption of lithium during the charge and discharge. In the case where the positive electrode active material includes secondary particles, large stress is generated inside the secondary particles because of this repetition. In consequence, when the positive electrode active material includes secondary particles, it is considered that the aggregation of the primary particles is dissolved and the positive electrode active material is broken. A new particle surface created by the breaking of the secondary particles may decompose the non-aqueous electrolyte owing to contact with the non-aqueous electrolyte, and as a result, cycle characteristics may be decreased. Therefore, it is preferable that the lithium nickel composite oxide of the present invention includes primary particles having a median diameter of 8 μm or more and that it does not form secondary particles.

On the other hand, it is preferable that the median diameter of the primary particles of the lithium nickel composite oxide is 13 μm or less. In the case where the median diameter of the positive electrode active material is too large, there is a tendency that the control of the thickness of the positive electrode becomes difficult.

As described above, in the lithium nickel composite oxide of the present invention, electronic conductivity inside the positive electrode can be maintained by setting the median diameter of the primary particles to 8 µm or more and 13 µm or less even in the case where contact points between the primary particles are small in number.

In the present invention, the median diameter of the primary particles is an average particle diameter on the volume basis, and can be determined by measurements with a laser diffraction/scatter type particle size distribution measurement apparatus. In the case of measuring with the laser diffraction/scatter type particle size distribution measurement apparatus, for example an ion exchange water can be used as a dispersion medium of the primary particles, and in this case, it is preferable to carry out ultrasonic dispersion before measurements.

Also, the median diameter can be calculated by observation of the particles by SEM. In this case, the average particle diameter on the number basis is determined. Herein, a part of the powder is extracted and an SME photograph is taken, and particles are extracted arbitraly by looking at the photograph, and the average value thereof is determined as the median diameter. Regarding long and narrow particles, the particle diameter can be calculated by averaging the longitudinal and lateral lengths.

It is preferable that the BET specific surface area of the lithium nickel composite oxide is 0.3 m$^2$/g or more and 0.8 m$^2$/g or less. This is because the decomposition reaction of the non-aqueous electrolyte does not readily occur when the specific surface area is small. In the case where the specific surface area exceeds 0.8 m$^2$/g, it is not preferable because reaction with the non-aqueous electrolyte occurs. Also, in the case where the specific surface area is below 0.3 m$^2$/g, it is not preferable because the median diameter of the primary particles exceeds 13 µm in general, and therefore the production of the electrode becomes difficult.

Production of Sodium Nickel Composite Oxide

The present invention discloses a method for synthesizing a lithium nickel composite oxide by an ion exchange reaction between Na$^+$ ion with lithium (Li$^+$) ion, and for this synthesis, it is necessary to synthesize a sodium nickel composite oxide as a precursor.

It is preferable that the sodium nickel composite oxide as the precursor is represented by the general formula: $Na_aNi_{1-b}Me_bO_2$. In this the general formula, Me is the same as above. "a" represents an atomic ratio of Na and $0.7<a\leq1$. When the value of "a" becomes too small, there is a tendency that the amount of lithium in the lithium nickel composite oxide obtained after the ion exchange step of Na$^+$ ions and Li$^+$ ions described below becomes too small, which results in insufficient charge and discharge capacity. "b" represents an atomic ratio of Me, and $0\leq b\leq0.34$.

From the viewpoint of suppressing growth or collapse of the primary particles during the ion exchange reaction between Na$^+$ ions and Li$^+$ ions, it is preferable that the primary particles of the sodium nickel composite oxide has a median diameter (average particle diameter on volume basis) of 8 µm or more and 13 µm or less.

The sodium nickel composite oxide can be obtained, for example, by mixing a nickel composite oxide with a sodium metal source and baking the mixture. Also, the size of the primary particles of the obtained sodium nickel composite oxide can be controlled appropriately by the reaction temperature and the reaction time.

The reaction temperature is preferably 750° C. or more and 850° C. or less. Normally, the higher the reaction temperature is, the larger the primary particles can be made. However, if the reaction temperature rises and exceeds the above range, the sodium metal source may volatilize and may possibly hinder the reaction with the nickel composite oxide from progressing sufficiently. On the contrary, if the reaction temperature is below the above range, the particle diameter of the sodium nickel composite oxide may not possibly be increased, and therefore the median diameter of the primary particles may not possibly be set to the above range.

The reaction time is preferably an hour or more and 24 hours or less, and more preferably 5 hours or more and 15 hours or less. Normally, the longer the reaction time is, the larger the primary particles can be. However, if the reaction time is lengthened and exceeds the above range, the sodium metal source may volatilize and may possibly hinder the reaction with the nickel composite oxide from progressing sufficiently. On the contrary, if the reaction time is below the above range, the particle diameter of the sodium nickel composite oxide may not possibly be increased, and thus the median diameter of the primary particles may not possibly be set to the above range.

It is possible that the reaction of the nickel composite oxide with the sodium metal source is carried out under an oxygen atmosphere.

Examples of the sodium metal source include $Na_2O$, $Na_2O_2$, NaOH, $Na_2CO_3$, $NaNO_3$, $NaHCO_3$, $NaOCH_3$, $NaOCH_2CH_3$, $NaOCH(CH_3)_2$, $NaOCOCH_3$, and $Na_2(OCO)_2$. These substances can be used alone or in a mixture of two or more kinds.

In the sodium metal source, it is preferable that the amount of sodium is excessively used relative to the amount of nickel in the nickel composite oxide. This is for sufficiently preventing the stoichiometric ratio of the product from shifting by volatilization of the sodium metal source.

The composition of the nickel composite oxide is not particularly limited and can be set appropriately according to the composition of the lithium nickel composite oxide obtained after the ion exchange step as described below. Therefore, it is preferably represented for example by, but not limited to, the general formula: $Ni_{1-b}Me_bO$ (Me and b is the same as above).

The method for mixing the nickel composite oxide with the sodium metal source is not particularly limited, and for example, there is a method of mixing by using a mortar. Since the sodium nickel composite oxide has a high reactivity with moisture in the air, it may produce byproducts such as hydroxides if stored in an environment without control of dew-point. Therefore, it is preferable that the operation of mixing the nickel composite oxide with the sodium metal source and the storage of the mixture obtained by mixing are done under a dry atmosphere, specifically a dry atmosphere with a dew point of −40° C. or less.

Production of Lithium Nickel Composite Oxide

Next, the lithium nickel composite oxide can be synthesized by treating the above sodium nickel composite oxide with a molten salt containing lithium. For synthesis of the lithium nickel composite oxide, heat treatment is carried out in two steps of an ion exchange step (first stage) and a baking step (second stage) as described below.

In the ion exchange step, the sodium nickel composite oxide and a molten salt containing lithium are mixed and an obtained mixture is heat treated. Consequently, Na$^+$ ions of the sodium nickel composite oxide and Li$^+$ ions of the molten salt containing lithium are exchanged by an ion exchange reaction.

Examples of the lithium salt used as the molten salt containing lithium include $LiOH \cdot H_2O$, $Li_2CO_3$, $LiNO_3$, $Li_2O_2$, $Li_2O$, $LiHCO_3$, $LiF$, $LiCl$, and $LiBr$.

In the above ion exchange step, particles of sodium nickel composite oxide are added in the molten salt containing lithium, and the heating state is maintained for a prescribed time at a temperature of 400° C. or less, preferably 200° C. or more and 400° C. or less. If the heating temperature (temperature of ion exchange reaction) exceeds 400° C., the reaction may progress rapidly thereby to cause an uneven reaction. If the heating temperature is below 200° C., the reaction may not progress sufficiently.

In the baking step, the mixture after the ion exchange step is baked at 600° C. or more and 800° C. or less, preferably 650° C. or more and 750° C. or less.

If the baking temperature at the baking step is below 600° C., the baking reaction may not possibly progress. On the other hand, if the baking temperature exceeds 800° C., a so-called disorder reaction where an array structure of lithium atoms and nickel atoms may progress, which results in a decrease the charge and discharge characteristics.

In the baking step, it is preferable that the mixture after the ion exchange step is used as it is, that is, in the state of the mixture of the particles of sodium nickel composite oxide with the molten salt containing lithium. After the ion exchange step at the first stage, in the case where the mixture is washed with water and the baking is carried out in an oxygen atmosphere, a disorder reaction may possibly progress, which results in a decrease the charge and discharge capacity. However, the reason for this is not known.

In the case where only the ion exchange step (first stage) is carried out without going through the baking step (second stage), the above mixture of the particles of the sodium nickel composite oxide with the molten salt containing lithium is heat treated at 400° C. or less, simply. In this case, owing to the fact that $Na^+$ ions have a larger ion radius than $Li^+$ ions, distortion on account of reduction of volume inside the particles formed through the ion exchange step, and in the end, cracks are generated in the powder of the lithium nickel composite oxide (see FIG. 4). On the other hand, in the present invention, since the baking step is carried out after the ion exchange step, as described above, generation of cracks in the powder of the lithium nickel composite oxide can be suppressed sufficiently.

In the present invention, it is preferable that both the ion exchange step and the baking step have a reaction time of 2 to 10 hours.

The reason for dividing the synthesis of the lithium nickel composite oxide into two stages to advance the reaction is that the ion exchange reaction between $Na^+$ ions and $Li^+$ ions can progress sufficiently by first going through the ion exchange step with the heating temperature set to 400° C. or less. Further, by subsequently carrying out the baking step with the heating temperature set to 600° C. or more and 800° C. or less, the baking can progress sufficiently.

Figure 3:
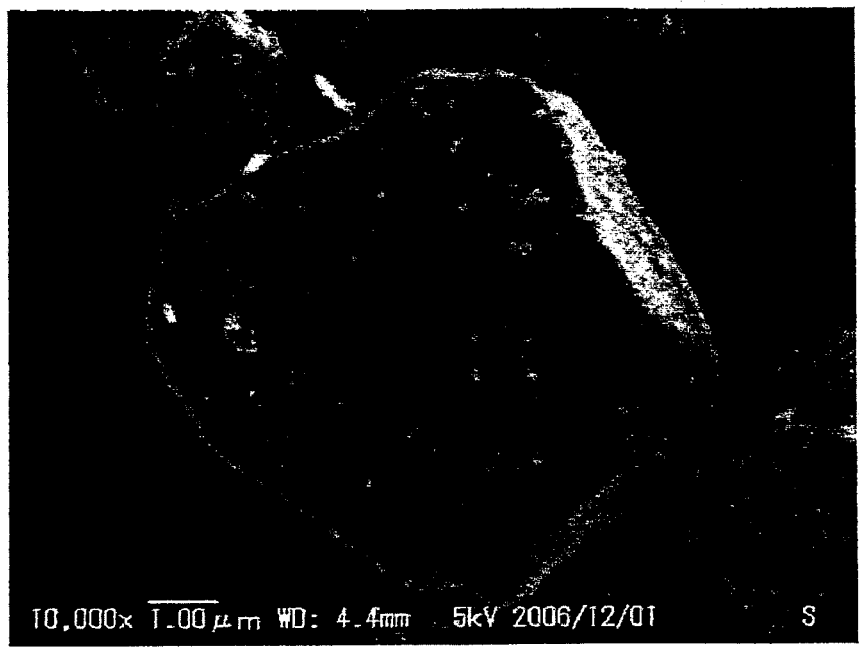
[FIG. 3] A scanning electron microscope (SEM) photograph with regard to the lithium nickel composite oxide of Example 1.
Figure 4:
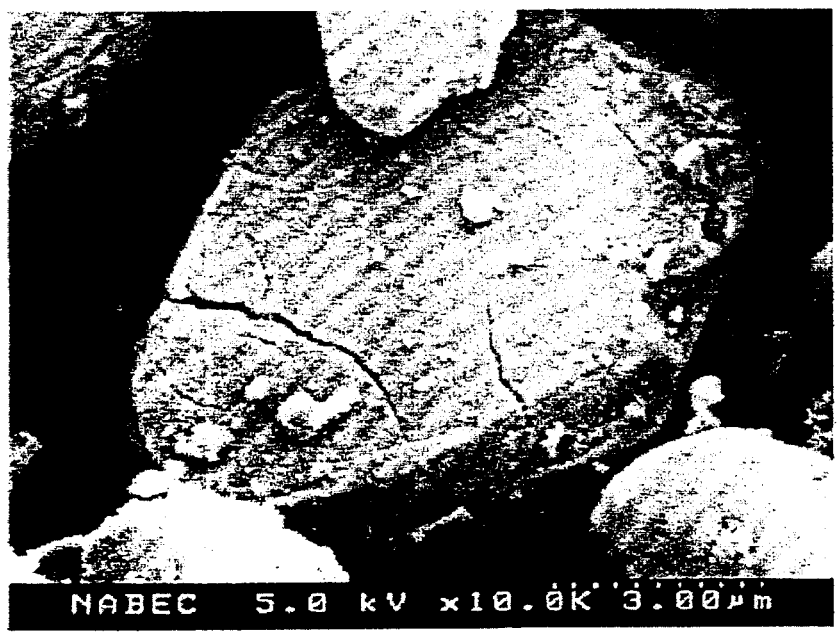
[FIG. 4] An SEM photograph with regard to a lithium nickel composite oxide subjected to an ion exchange step only (first stage).

FIG. 3 shows an SEM photograph of a lithium nickel composite oxide synthesized by the production method of the present invention (see Example 1 below), and FIG. 4 shows an SEM photograph of a lithium nickel composite oxide subjected to the ion exchange step only (first stage). As explicit from FIG. 3, no crack is generated in the lithium nickel composite oxide synthesized through the ion exchange step and the baking step according to the production method of the present invention. On the other hand, as explicit from FIG. 4, cracks are generated in the lithium nickel composite oxide subjected to the ion exchange step and not subjected to the baking step (second stage).

It is preferable to carry out the above ion exchange step and baking step in a dry atmosphere of at least a dew point of −20° C. or less, preferably a dew point of −40° C. or less. It is for preventing a decrease in the charge and discharge capacity of the positive electrode active material caused by generation of byproducts such as hydroxides.

Further, in the above reaction, it is preferable to use excessively the molten salt containing lithium such that the amount of lithium in the molten salt is, in a molar ratio, at least three times as much as the amount of sodium in the sodium nickel composite oxide. In the case where the amount of the molten salt is less than the above magnification, the ion exchange reaction between the sodium ions and the lithium ions may become insufficient and thus the charge and discharge capacity of the positive electrode active material may be decreased.

Then, the lithium nickel composite oxide obtained by reaction with the molten salt is washed with water. This is because in the case where the molten salt remains on the particle surface, there is a possibility that the remaining lithium salt reacts with the non-aqueous electrolyte in the case where the charge and discharge are repeated, and consequently a large amount of gas may be generated.

It is preferable that the lithium nickel composite oxide washed with water is vacuum dried at 150° C. or more and 300° C. or less. A temperature lower than 150° C. is not preferable because moisture contained in the lithium nickel composite oxide cannot be removed. Also, a temperature more than 300° C. is not preferable because the charge and discharge capacity decreases, although the specific reason for this is not clear.

Next, a non-aqueous electrolyte, secondary battery using the above positive electrode active material will be described.

A positive electrode usually includes a positive electrode current collector and a positive electrode active material layer supported thereon. A positive electrode material mixture forming the positive electrode active material layer may contain a binder, a conductive agent etc. in addition to the positive electrode active material. The positive electrode is prepared, for example, by mixing the positive electrode material mixture including the positive electrode active material and optional components with a liquid component to prepare a positive electrode material mixture slurry, applying the obtained slurry onto the positive electrode current collector, and drying the same. Similarly, the negative electrode is prepared by mixing the negative electrode material mixture including the negative electrode active material and optional components with a liquid component to prepare a negative electrode material mixture slurry, applying the obtained slurry onto the negative electrode current collector, and drying the same.

Examples of the negative electrode active material for the non-aqueous electrolyte secondary battery of the present invention include metals, carbon materials, oxides, nitrides, tin compounds, silicon compounds, and various alloy materials.

Examples of the binder used in the positive or negative electrode include fluorocarbon polymers such as polytetrafluoroethylene, polyvinylidene fluoride, modified polyvinylidene fluoride, tetrafluoroethylene-hexafluoropropylene copolymer (FEP); rubber particles such as styrene-butadiene rubber (SBR); polyolefin resins such as polyethylene and polypropylene without limitation thereto. Also, examples of a thickener for stabilizing the paste include cellulose resins such as carboxymethyl cellulose (CMC). Examples of the conductive agent include graphites, carbon blacks such as acetylene black, ketjen black, furnace black, lump black and thermal black, carbon fibers, and metal fibers.

It is preferable that the mixing ratio of the positive electrode active material, the conductive agent, and the binder is 80 to 97% by weight, 1 to 20% by weight, and 1 to 10% by weight, respectively.

As the current collector, a long conductive substrate having a porous structure or a conductive substrate without pores is used. Examples of the material used as the conductive substrate for the positive electrode current collector include stainless steel, aluminum, and titanium. The thickness of the current collector is preferably 1 to 500 µm, more preferably 5 to 20 µm, but not particularly limited thereto. By setting the thickness of the current collector to the above range, the electrode plate can be made lightweight while maintaining the strength thereof.

In the production of the positive electrode, first, the positive electrode active material, the conductive agent, and the binder are suspended in an appropriate dispersion medium, and a slurry thus obtained is applied onto the surface of the positive electrode current collector and dried to form a positive electrode active material layer. Thereafter, the positive electrode active material layer is pressed for 1 to 5 times with a desired pressure to produce the positive electrode. It is preferable that the filling density of the positive electrode active material layer after pressing is 2.0 g/cm$^3$ or more and 3.9 g/cm$^3$ or less. The application method and the pressing method will be described in detail in Examples.

As a separator disposed between the positive electrode and the negative electrode, a microporous thin film, a woven cloth, or a nonwoven cloth exhibiting a high ion permeability and having both prescribed mechanical strength and insulating property. As the material for the separator, for example polyolefins such as polypropylene and polyethylene are preferable in view of the safety of the non-aqueous electrolyte secondary battery because they have a favorable durability and also a shutdown function. The thickness of the separator is generally 10 to 300 µm, preferably 40 µm or less, more preferably 5 to 30 µm, and particularly preferably 10 to 25 µm. Further, the microporous film can be a monolayer film consisting of one material, or a composite film or a multilayer film consisting of two or more materials. The porosity of the separator is preferably 30 to 70%, and more preferably 35 to 60%. Herein, the porosity indicates a volume ratio of the pores relative to the volume of the separator.

As the non-aqueous electrolyte, a liquid, gel or solid (solid polymer electrolyte) material can be used.

A liquid non-aqueous electrolyte can be obtained by dissolving a solute (e.g. lithium salt) into a non-aqueous solvent. Also, a gel electrolyte includes a non-aqueous electrolyte and a polymer material retaining this non-aqueous electrolyte. Appropriate examples of this polymer material include polyvinylidene fluoride, polyhexafluoropropylene, vinylidene fluoride-hexafluoropropylene copolymer, polyacrylonitrile, polyethylene oxide, polyvinyl chloride, and polyacrylate.

As the non-aqueous solvent, a known non-aqueous solvent can be used. Although the kind of this non-aqueous solvent is not particularly limited, for example cyclic carbonic acid esters, chain carbonic acid esters, and cyclic carboxylic acid esters can be used. Examples of the cyclic carbonic acid esters include propylene carbonate (PC) and ethylene carbonate (EC). Examples of the chain carbonic acid esters include diethyl carbonate (DEC), ethylmethyl carbonate (EMC), and dimethyl carbonate (DMC). Examples of the cyclic carboxylic acid esters include γ-butyrolactone (GBL), and γ-valerolactone (GVL). The non-aqueous solvent can be used singly or in combination of two or more kinds.

Examples of the solutes dissolved in the non-aqueous solvent include $LiClO_4$, $LiBF_4$, $LiPF_6$, $LiAlCl_4$, $LiSbF_6$, LiSCN, $LiCF_3SO_3$, $LiCF_3CO_2$, $LiAsF_6$, $LiB_{10}Cl_{10}$, lithium lower aliphatic carboxylate, LiCl, LiBr, LiI, chloroborane lithium, borates, and imide salts. Examples of borates include lithium bis(1,2-benzenediolato(2-)-O,O')borate, lithium bis(2,3-naphthalenediolato(2-)-O,O')borate, lithium bis(2,2'-biphenyldiolato(2-)-O,O')borate, and lithium bis(5-fluoro-2-olato-1-benzenesulfonato(2-)-O,O')borate. Examples of the imide salts include lithium bis(trifluoromethanesulfonyl)imide (($CF_3SO_2)_2NLi$), lithium trifluoromethanesulfonyl nonafluorobutanesulfonyl imide (($CF_3SO_2$) ($C_4F_9SO_2$)NLi), lithium bis(pentafluoroethanesulfonyl)imide (($C_2F_5SO_2)_2$ NLi). The solute can be used singly or in combination of two or more kinds. It is preferable that the amount of the solute dissolved in the non-aqueous solvent is set within the range of 0.5 to 2 mol/L.

Further, it is preferable that the non-aqueous electrolyte contains a cyclic carbonic acid ester having at least one carbon-carbon unsaturated bond. The reason for this is that it decomposes on the negative electrode to form a coating film having a high lithium ion conductivity, thereby to increase the charge and discharge efficiency. Examples of the cyclic carbonic acid ester having at least one carbon-carbon unsaturated bond include vinylene carbonate (VC), 3-methylvinylene carbonate, 3,4-dimethylvinylene carbonate, 3-ethylvinylene carbonate, 3,4-diethylvinylene carbonate, 3-propylvinylene carbonate, 3,4-dipropylvinylene carbonate, 3-phenylvinylene carbonate, 3,4-diphenylvinylene carbonate, vinylethylene carbonate (VEC), and divinylethylene carbonate. These can be used singly or in combination of two or more kinds. Among these, at least one selected from the group consisting of vinylene carbonate, vinylethylene carbonate, and divinylethylene carbonate. Herein, in the above compounds, a part of the hydrogen atoms may be replaced by fluorine atoms.

Moreover, in the non-aqueous electrolyte, a known benzene derivative that decomposes when overcharged and forms a coating film on the electrode to inactivate the battery may be contained. As the benzene derivative, one having a phenyl group or a cyclic compound group adjacent to the phenyl group is preferable. As the cyclic compound group, a phenyl group, cyclic ether group, cyclic ester group, cycloalkyl group, phenoxy group etc. are preferable. Specific examples of the benzene derivative include cyclohexyl benzene, biphenyl, and diphenyl ether. These substances can be used singly or in combination of two or more kinds. Herein, it is preferable that the content of the benzene derivative is 10% by volume or less relative to the total of the non-aqueous solvent, A battery-type electric vehicle of the present invention includes a vehicle and a prime mover for driving this vehicle, wherein the prime mover includes at least an electric motor driven by a secondary battery, and the non-aqueous electrolyte secondary battery of the present invention is included as the secondary battery.

The vehicle is not particularly limited and a variety of vehicles applied to battery-type electric vehicles can be exemplified. Specifically, various vehicles of general cars such as sedan type, wagon type, light motor vehicles, and motorcycles can be exemplified. These various types of vehicles require an electric motor having a large capacity and a high output for driving the prime mover, and the non-aqueous electrolyte secondary battery of the present invention is suitable as a secondary battery driving this electric motor.

The prime mover is not particularly limited except for including at least an electric motor driven by a secondary battery. Therefore, the battery-type electric vehicles of the present invention include so-called electric vehicles including only an electric motor driven by a secondary battery, and hybrid vehicles including both an electric motor driven by a secondary battery and an internal combustion engine.

Electric tools of the present invention include a driven portion and an electric motor for driving this driven portion driven by at least a secondary battery.

The electric tools are not particularly limited, and specifically, an impact driver, an impact wrench, and a drill driver can be exemplified. These various kinds of electric tools require a power source having a large capacity and a high output for driving the driven portion, and the non-aqueous electrolyte secondary battery of the present invention is suitable as the power source for driving.

EXAMPLES

The present invention will be described on the basis of Examples.

Example 1

(1) Production of Positive Electrode Active Material

Nickel sulfate hexahydrate ($NiSO_4 \cdot 6H_2O$), cobalt sulfate heptahydrate ($CoSO_4 \cdot 7H_2O$), and aluminum sulfate hexadecahydrate ($Al_2(SO_4)_3 \cdot 16H_2O$) were mixed such that the atomic ratio of Ni, Co, and Al is 81:16:3, and this mixture was dissolved in water. Next, a 1 mol/L sodium hydroxide (NaOH) solution was dropped into the obtained mixed solution and a coprecipitated matter was obtained. Then, the coprecipitated matter was collected by filtration, dried and pulverized to obtain a nickel composite hydroxide including secondary particles having a median diameter of 5 to 20 μm. Further, this nickel composite hydroxide was baked at 700° C. in an oxygen atmosphere for 12 hours to obtain a nickel composite oxide having a median diameter of 5 to 20 μm. The composition of this nickel composite oxide was $Ni_{0.81}Co_{0.16}Al_{0.03}O$. Hereinafter, the nickel composite oxide having this composition is referred to as NCAO.

Next, in a dry atmosphere, NCAO and sodium peroxide ($Na_2O_2$) were mixed in a molar ratio of 1:0.525. Then, the obtained mixture was baked in an oxygen atmosphere at 750° C. for 12 hours to obtain a sodium nickel composite oxide having primary particles with a median diameter of about 8 μm. The composition of this sodium nickel composite oxide was $NaNi_{0.81}Co_{0.16}Al_{0.03}O_2$.

Next, in order to obtain a lithium nickel composite oxide, the above sodium nickel composite oxide was subjected to a heat treatment of two stages. First, as a heat treatment of a first stage (ion exchange step), the sodium nickel composite oxide was added to lithium nitrate ($LiNO_3$) heated to 300° C. and melted, and the obtained mixture was reacted in a dry atmosphere with a dew point of −40° C. for 3 hours. At this time, the temperature of the mixture was set within the range of 250 to 350° C. and adjusted not to exceed 400° C. By this baking of the first stage, an ion exchange reaction between $Na^+$ ions ons and $Li^+$ ions progressed in the above mixture.

Subsequently, as the baking of the second stage (baking step), the product of the heat treatment of the first stage (ion exchange step) was heated to 700° C. and reacted for 3 hours.

The amount of $LiNO_3$ at this time was 3 mol equivalent weight relative to 1 mol of $NaNi_{0.81}Co_{0.16}Al_{0.03}O_2$. Then, after the above reaction product was cooled to room temperature, it was pulverized in a mortar made of agate. The pulverized product to which an ion exchange water was added was stirred sufficiently, and then suction filtered to obtain a powder. The obtained powder was dried in vacuum at 300° C. for an hour to obtain a positive electrode active material A.

The composition of the positive electrode active material A was specified as $Li_{0.97}Na_{0.03}Ni_{0.81}Co_{0.16}Al_{0.03}O_2$ by an inductive coupled plasma (ICP) analysis. The positive electrode active material A had a volume resistivity of 77 Ω·cm when the bulk density of the powder was 3 g/cm$^3$. The volume resistivity was measured by a four probe method. Specifically, the positive electrode active material A was filled in a case with an open top surface having a diameter of 2.5 cm and a depth of 5 cm such that the bulk density was 3 g/cm$^3$, and four probes were disposed on a top surface of a layer formed of the positive electrode active material A, and the measurement was carried out.

Further, by a particle size distribution measurement and an SEM observation, particles of the positive electrode active materials A having a median diameter of about 8 μm that were present in such a state that secondary particles were not formed substantially were confirmed. The BET specific surface area of the positive electrode active material A was 0.7 m$^2$/g.

(2) Production of Positive Electrode Plate

The above lithium nickel composite oxide, polyvinylidene fluoride (PVDF), and acetylene black were stirred by a double-armed kneader with an appropriate amount of N-methyl-2-pyrrolidone (NMP) and a positive electrode paste was prepared. The composition of this positive electrode paste was 92% by weight of lithium nickel composite oxide, 3.5% by weight of PVDF, and 4.5% by weight of acetylene black in all solid matter. Then, the above positive electrode paste was applied onto one surface of an aluminum foil (positive electrode current collector) having a thickness of 15 μm and dried to produce a positive electrode active material layer. Thereafter, the positive electrode current collector and the positive electrode active material layer were rolled to have a total thickness of 80 μm. The porosity of the positive electrode active material was 45%.

(3) Production of Negative Electrode Plate

Artificial graphite (KS-6: product of TIMCAL Japan), styrene-butadiene copolymer rubber (SBR), and carboxymethyl cellulose (CMC) were stirred with an appropriate amount of water by a double-armed kneader to prepare a negative electrode paste. The composition of this negative electrode paste was, relative to the total solid content, 98% by weight of artificial graphite, 1% by weight of SBR in terms of solid content, and 1% by weight of CMC in terms of solid content. Then, the above negative electrode paste was applied onto one surface of a copper foil (negative electrode current collector) having a thickness of 10 μm and dried to produce a negative electrode active material layer. Thereafter, the negative electrode current collector and the negative electrode active material layer were rolled to have a total thickness of 100 μm. The porosity of the negative electrode active material was 35%.

(4) Preparation of Non-Aqueous Electrolyte

1% by weight of vinylene carbonate was added to a mixed solvent of ethylene carbonate and ethylmethyl carbonate in a volume ratio of 1:3, and $LiPF_6$ was dissolved therein at a concentration of 1.0 mol/L to obtain a non-aqueous electrolyte.

(5) Production of Battery

Figure 5:
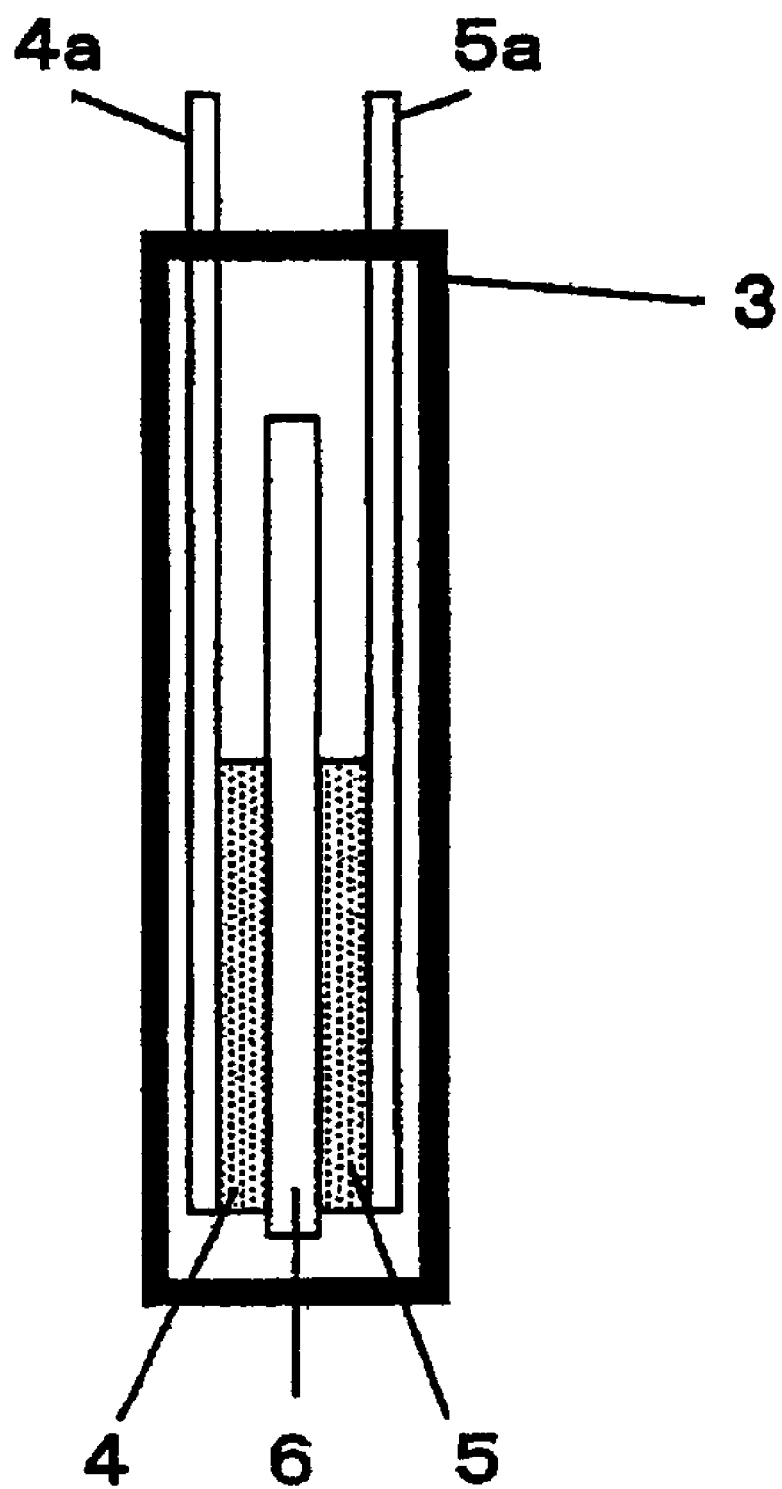
[FIG. 5] A schematic longitudinal sectional view of an embodiment of a non-aqueous electrolyte secondary battery of the present invention.

FIG. 5 is a schematic view of a non-aqueous electrolyte secondary battery. This non-aqueous electrolyte secondary battery includes an electrode group in which a positive electrode 4, a separator 6 made of polypropylene microporous film and a negative electrode 5 are stacked in this order.

The positive electrode 4 and the negative electrode 5 were respectively cut out in a size of 35 mm×35 mm. To the surface of the positive electrode 4 opposite to the separator 6, an aluminum plate as a positive electrode lead 4a was attached by ultrasonic welding. To the surface of the negative electrode 5 opposite to the separator 6, a copper plate as a negative electrode lead 5a was attached by ultrasonic welding. This electrode group and the pair of leads 4a and 5a were placed in a cylindrical bag (battery case) 3 made of a resin film including laminated aluminum, and one opening portion of the battery case 3 was adhered. The tip portions of the leads 4a and 5a were exposed outside from the other opening portion of the battery case 3. Then, the above non-aqueous electrolyte was dropped onto the above electrode group from the other opening portion, and subsequently the other opening portion of the battery case was adhered and sealed.

The non-aqueous electrolyte secondary battery assembled in this manner was charged at a current of 0.1 mA for an hour, degassed at 10 mmHg for 10 seconds, and the opening portion from which the electrolyte was poured was sealed by adhering. Then, preliminary charge-discharge cycle was carried out 5 times at an upper limit voltage of 4.2 V and a lower limit voltage of 3.0 V.

Example 2

A positive electrode active material B was prepared in the same manner as in Example 1 except that the baking temperature of the mixture of NCAO and $Na_2O_2$ was set to 800° C. in the synthesis of $NaNi_{0.81}Co_{0.16}Al_{0.03}O_2$ (precursor). The median diameter of the above precursor was about 10 μm. The composition of the positive electrode active material B was identified as $Li_{0.98}Na_{0.02}Ni_{0.81}Co_{0.16}Al_{0.03}O_2$ by an ICP analysis. The positive electrode active material B had a volume resistivity of 38 Ω·cm when the bulk density of the powder was 3 g/cm³. By a particle size distribution measurement and an SEM observation, particles of the positive electrode active material B having a median diameter of about 10 μm that were present in such a state that secondary particles were not formed substantially were confirmed. The BET specific surface area of the positive electrode active material B was 0.5 m²/g.

Then, a non-aqueous electrolyte secondary battery was produced in the same manner as in Example 1 except that the positive electrode active material B was used in place of the positive electrode active material A.

Example 3

A positive electrode active material C was prepared in the same manner as in Example 1 except that the baking temperature of the mixture of NCAO and $Na_2O_2$ was set to 850° C. in the synthesis of $NaNi_{0.81}Co_{0.16}Al_{0.03}O_2$ (precursor). The precursor thus obtained had primary particles having a median diameter of about 13 μm. The composition of the positive electrode active material C was identified as $Li_{0.99}Na_{0.01}Ni_{0.81}Co_{0.16}Al_{0.03}O_2$ by an ICP analysis. The positive electrode active material C had a volume resistivity of 21 Ω·cm when the bulk density of the powder was 3 g/cm³. By a particle size distribution measurement and an SEM observation, particles of the positive electrode active material C having a median diameter of about 13 μm that were present in such a state that secondary particles were not formed substantially were confirmed. The BET specific surface area of the positive electrode active material C was 0.3 m²/g.

Then, a non-aqueous electrolyte secondary battery was produced in the same manner as in Example 1 except that the positive electrode active material C was used in place of the positive electrode active material A.

Example 4

A positive electrode active material D was prepared in the same manner as in Example 1 except that the temperature of the ion exchange reaction was set to 400° C. in the ion exchange step (first stage). The composition of the positive electrode active material D was identified as $Li_{0.97}Na_{0.03}Ni_{0.81}Co_{0.16}Al_{0.03}O_2$ by an ICP analysis. The positive electrode active material D had a volume resistivity of 97 Ω·cm when the bulk density of the powder was 3 g/cm³. By a particle size distribution measurement and an SEM observation, particles of the positive electrode active material D having a median diameter of about 8 μm that were present in such a state that secondary particles were not formed substantially were confirmed. The BET specific surface area of the positive electrode active material D was 0.6 m²/g.

Then, a non-aqueous electrolyte secondary battery was produced in the same manner as in Example 1 except that the positive electrode active material D was used in place of the positive electrode active material A.

Example 5

A positive electrode active material E was prepared in the same manner as in Example 1 except that the baking temperature in the baking step (second stage) was set to 600° C. The composition of the positive electrode active material E was identified as $Li_{0.95}Na_{0.05}Ni_{0.81}Co_{0.16}Al_{0.03}O_2$ by an ICP analysis. The positive electrode active material E had a volume resistivity of 82 Ω·cm when the bulk density of the powder was 3 g/cm³. By a particle size distribution measurement and an SEM observation, particles of the positive electrode active material E having a median diameter of about 8 μm that were present in such a state that secondary particles were not formed substantially were confirmed. The BET specific surface area of the positive electrode active material E was 0.8 m²/g.

Then, a non-aqueous electrolyte secondary battery was produced in the same manner as in Example 1 except that the positive electrode active material E was used in place of the positive electrode active material A.

Example 6

A positive electrode active material F was prepared in the same manner as in Example 1 except that the baking temperature in the baking step (second stage) was set to 800° C. The composition of the positive electrode active material F was identified as $Li_{0.99}Na_{0.01}Ni_{0.81}Co_{0.16}Al_{0.03}O_2$ by an ICP analysis. The positive electrode active material F had a volume resistivity of 67 Ω·cm when the bulk density of the powder was 3 g/cm³. By a particle size distribution measurement and an SEM observation, particles of the positive electrode active material F having a median diameter of about 9 μm that were present in such a state that secondary particles were not formed substantially were confirmed. The BET specific surface area of the positive electrode active material F was 0.6 m²/g.

Then, a non-aqueous electrolyte secondary battery was produced in the same manner as in Example 1 except that the positive electrode active material F was used in place of the positive electrode active material A.

Example 7

A positive electrode active material G was prepared in the same manner as in Example 1 except that the vacuum drying was carried out at a temperature of 150° C. The composition of the positive electrode active material G was identified as $Li_{0.97}Na_{0.03}Ni_{0.81}Co_{0.16}Al_{0.03}O_2$ by an ICP analysis. The positive electrode active material G had a volume resistivity of 79 Ω·cm when the bulk density of the powder was 3 g/cm³. By a particle size distribution measurement and an SEM observation, particles of the positive electrode active material G having a median diameter of about 8 μm that were present in such a state that secondary particles were not formed substantially were confirmed. The BET specific surface area of the positive electrode active material G was 0.8 m²/g.

Then, a non-aqueous electrolyte secondary battery was produced in the same manner as in Example 1 except that the positive electrode active material G was used in place of the positive electrode active material A.

Comparative Example 1

A positive electrode active material H was prepared by scaling NCAO as a nickel composite oxide and $LiOH \cdot H_2O$ in a molar ratio of 1:1.03, mixing these materials sufficiently in a mortar made of agate and heat treating the obtained mixture in an oxygen atmosphere at 850° C. for 12 hours. The composition of the positive electrode active material H was identified as $LiNi_{0.81}Co_{0.16}Al_{0.03}O_2$ by an ICP analysis. The positive electrode active material H had a volume resistivity of 190 Ω·cm when the bulk density of the powder was 3 g/cm³. By a particle size distribution measurement and an SEM observation, the positive electrode active material H had an average particle diameter of about 1 μm and included secondary particles having a median diameter of about 13 μm. The BET specific surface area of the positive electrode active material H was 1.1 m²/g.

Then, a non-aqueous electrolyte secondary battery was produced in the same manner as in Example 1 except that the positive electrode active material H was used in place of the positive electrode active material A.

Comparative Example 2

A positive electrode active material I was prepared in the same manner as in Example 1 except that the baking temperature of the mixture of NCAO and $Na_2O_2$ was set to 700° C. in the synthesis of $NaNi_{0.81}Co_{0.16}Al_{0.03}O_2$ (precursor). The median diameter of the above precursor was about 5 μm. The composition of the positive electrode active material I was identified as $Li_{0.95}Na_{0.05}Ni_{0.81}Co_{0.16}Al_{0.03}O_2$ by an ICP analysis. The positive electrode active material I had a volume resistivity of 134 Ω·cm when the bulk density of the powder was 3 g/cm³. By a particle size distribution measurement and an SEM observation, particles of the positive electrode active material I having a median diameter of about 5 μm that were present in such a state that secondary particles were not formed substantially were confirmed. The BET specific surface area of the positive electrode active material I was 1.0 m²/g.

Then, a non-aqueous electrolyte secondary battery was produced in the same manner as in Example 1 except that the positive electrode active material I was used in place of the positive electrode active material A.

Comparative Example 3

A positive electrode active material J was prepared in the same manner as in Example 1 except that the temperature of the heat treatment in the ion exchange step (first stage) was set to 450° C. The composition of the positive electrode active material J was identified as $Li_{0.93}Na_{0.07}Ni_{0.81}Co_{0.16}Al_{0.03}O_2$ by an ICP analysis. The positive electrode active material J had a volume resistivity of 156 Ω·cm when the bulk density of the powder was 3 g/cm³. By a particle size distribution measurement and an SEM observation, particles of the positive electrode active material J having a median diameter of about 8 μm that were present in such a state that secondary particles were not formed substantially were confirmed. The BET specific surface area of the positive electrode active material J was 0.7 m²/g.

Then, a non-aqueous electrolyte secondary battery was produced in the same manner as in Example 1 except that the positive electrode active material J was used in place of the positive electrode active material A.

Comparative Example 4

A positive electrode active material K was prepared in the same manner as in Example 1 except that the baking temperature in the baking step (second stage) was set to 850° C. The composition of the positive electrode active material K was identified as $Li_{0.99}Na_{0.01}Ni_{0.81}Co_{0.16}Al_{0.03}O_2$ by an ICP analysis. The positive electrode active material K had a volume resistivity of 115 Ω·cm when the bulk density of the powder was 3 g/cm³. By a particle size distribution measurement and an SEM observation, particles of the positive electrode active material K having a median diameter of about 8 μm that were present in such a state that secondary particles were not formed substantially were confirmed. The BET specific surface area of the positive electrode active material K was 0.6 m²/g.

Then, a non-aqueous electrolyte secondary battery was produced in the same manner as in Example 1 except that the positive electrode active material K was used in place of the positive electrode active material A.

Comparative Example 5

Nickel hydroxide including primary particles having an average diameter of 6.9 μm, cobalt oxide including primary particles having an average diameter of 0.4 μm, and pulverized $LiOH \cdot H_2O$ were scaled in a molar ratio of 0.8:0.2:1.03, and these materials were mixed sufficiently in a mortar made of agate. Then, the obtained mixture was heat treated in an air atmosphere at 500° C. for 3 hours, and thereafter heat treated at 700° C. for 20 hours to prepare a positive electrode active material L. The composition of the positive electrode active material L was identified as $Li_{0.99}Ni_{0.8}Co_{0.2}O_2$ by an ICP analysis. The positive electrode active material L had a volume resistivity of 109 Ω·cm when the bulk density of the powder was 3 g/cm³. By a particle size distribution measurement and an SEM observation, particles of the positive electrode active material L having a median diameter of about 7 μm that were present in such a state that secondary particles were not formed substantially were confirmed. The BET specific surface area of the positive electrode active material L was 0.9 m²/g.

Then, a non-aqueous electrolyte secondary battery was produced in the same manner as in Example 1 except that the positive electrode active material L was used in place of the positive electrode active material A.

Evaluation of Batteries

The following cycle test and output test were carried out with the non-aqueous electrolyte secondary batteries of Examples 1 to 7 and Comparative Examples 1 to 5 obtained as above, and physical properties of the batteries were evaluated.

Cycle Test

Charging and discharging were repeated at an upper limit voltage of 4.2 V and a lower limit voltage of 3.0 V under the conditions of an ambiant temperature of 40° C. and 1 C. Discharge capacities at the first cycle and discharge capacities at the 50$^{th}$ cycle are shown in Table 1 as standardized value per unit mass of the positive electrode active material. Also, ratios (B)/(A) of the discharge capacities (B) at the 50$^{th}$ cycle relative to the discharge capacities (A) at the fist cycle are shown in Table 1.

Output Test

An output characteristic test was carried out under the conditions of a state of charge (SOC) of 60% and an ambient temperature of 25° C. SOC in the output characteristic test was set to 60% because batteries for HEV are generally used in the state that SOC is about 60%, although there are changes according to the control system thereof. Specific test conditions were that the non-aqueous electrolyte secondary batteries were charged until SOC became 60%, and were left in an environment of 25° C. for 10 hours or more. Subsequently, an alternate current impedance measurement was carried out and a Cole-Cole plot was made. On the basis of the plot thus made, the size of an arc representing greatness of the internal resistance of the non-aqueous electrolyte secondary battery was determined. It is considered that larger the arc is, larger the internal resistance inside the battery is, and therefore the output characteristics decrease.

Evaluation results of Examples and Comparative Examples will be described in the following. First, the results of the cycle test is shown in Table 1.

particles collapsed by the stress caused by expansion and contraction of the primary particles along with absorption and desorption of lithium, and consequently a new surface was formed.

From the result of comparison between Examples 1 to 7 and Comparative Examples 2 and 5, it is considered that, in Examples 1 to 7, since the lithium nickel composite oxide include primary particles having a large median diameter and small specific surface area, decomposition reaction between the positive electrode active material and the non-aqueous electrolyte did not readily occur, and therefore cycle characteristics of the non-aqueous electrolyte secondary batteries were improved.

In Comparative Example 3, since the temperature of the ion exchange reaction in the ion exchange step (first stage) was high, the reaction was uneven and a large amount of sodium remained in the lithium nickel composite oxide. For this reason, the cycle characteristics of the non-aqueous electrolyte secondary battery were considered to be lowered.

In Comparative Example 4, it is considered that since the temperature of the heat treatment in the baking step (second stage) was high, a disorder reaction between lithium and nickel progressed to lower the cycle characteristics of the non-aqueous electrolyte secondary batteries.

Next, the results of the output test are shown in Table 2. In Table 2, the size of the arc in Comparative Example 1 was referred to as 100, and on the basis thereof, the size of the arc in Examples 1 to 7 and Comparative Examples 2 to 5 were shown as relative values.

TABLE 1

| | Particle diameter of precursor [μm] | Composite oxide | | | Discharge capacity at m$^{th}$ cycle *5 | | |
|---|---|---|---|---|---|---|---|
| | | Composition | Resistivity *4 | Particle diameter [μm] | m = 1 (A) | m = 50 (B) | Ratio (B)/(A) |
| Example 1 | about 8 | x = 0.03 *1 | 77 | about 8 | 191 | 163 | 0.853 |
| Example 2 | about 10 | x = 0.02 *1 | 38 | about 10 | 196 | 178 | 0.908 |
| Example 3 | about 13 | x = 0.01 *1 | 21 | about 13 | 203 | 192 | 0.946 |
| Example 4 | about 8 | x = 0.03 *1 | 97 | about 8 | 179 | 147 | 0.821 |
| Example 5 | about 8 | x = 0.05 *1 | 82 | about 8 | 175 | 148 | 0.846 |
| Example 6 | about 8 | x = 0.01 *1 | 67 | about 9 | 187 | 166 | 0.888 |
| Example 7 | about 8 | x = 0.03 *1 | 79 | about 8 | 189 | 160 | 0.847 |
| Com. Ex. 1 | — | *2 | 190 | about 1 (about 13) | 152 | 113 | 0.743 |
| Com. Ex. 2 | about 5 | x = 0.05 *1 | 134 | about 5 | 188 | 146 | 0.777 |
| Com. Ex. 3 | about 8 | x = 0.07 *1 | 156 | about 8 | 168 | 115 | 0.685 |
| Com. Ex. 4 | about 8 | x = 0.01 *1 | 115 | about 8 | 157 | 123 | 0.783 |
| Com. Ex. 5 | — | *3 | 109 | about 7 | 185 | 144 | 0.778 |

*1: Composition of the composite oxide is $Li_{1-x}Na_xNi_{0.81}Co_{0.16}Al_{0.03}O_2$
*2: Composition of the composite oxide is $LiNi_{0.81}Co_{0.16}Al_{0.03}O_2$.
*3: Composition of the composite oxide is $LiNi_{0.8}Co_{0.2}O_2$.
*4: Resistivity of the composite oxide represents volume resistivity [Ω·cm] when bulk density of the powder is 3 g/cm$^3$.
*5: Unit of discharge capacity is [mAh/g].

All of the non-aqueous electrolyte secondary batteries of Examples 1 to 7 had a ratio (B)/(A) of the discharge capacity (B) at the 50$^{th}$ cycle relative to the discharge capacity (A) at the first cycle exceeding 0.82 and exhibited superior charge-discharge cycle characteristics. On the other hand, the non-aqueous electrolyte secondary batteries of Comparative Examples 1 to 3 had the ratio (B)/(A) below 0.79 and exhibited inferior cycle characteristics.

In the lithium nickel composite oxide of Comparative Example 1, primary particles aggregated and formed secondary particles. The reason for which the cycle characteristics of the non-aqueous electrolyte secondary battery of Comparative Example 1 decreased is considered that the secondary

TABLE 2

| | Relative value of size of arc |
|---|---|
| Example 1 | 88.3 |
| Example 2 | 84.5 |
| Example 3 | 81.6 |
| Example 4 | 88.8 |
| Example 5 | 88.6 |
| Example 6 | 86.7 |
| Example 7 | 88.9 |
| Comparative Example 1 | 100 |
| Comparative Example 2 | 97.1 |

TABLE 2-continued

|  | Relative value of size of arc |
|---|---|
| Comparative Example 3 | 99.0 |
| Comparative Example 4 | 94.3 |
| Comparative Example 5 | 93.5 |

It is found that all the non-aqueous electrolyte secondary batteries of Examples 1 to 7 have relative value of the size of the arc below 90, and therefore have low internal resistance inside the batteries and superior output characteristics in comparison with the non-aqueous electrolyte secondary battery of Comparative Example 1. The reason for which the output characteristics of the non-aqueous electrolyte secondary batteries of Examples 1 to 7 are superior is considered that the lithium nickel composite oxide of the present invention have a low volume resistivity of 100 to 20 Ω·cm at 3 g/cm³.

As clear from the results above, the positive electrode active material for a non-aqueous electrolyte secondary battery of the present invention can provide a non-aqueous electrolyte secondary battery having favorable charge and discharge cycle life characteristics and output characteristics.

INDUSTRIAL APPLICABILITY

Since the non-aqueous electrolyte secondary battery of the present invention have a favorable charge and discharge cycle characteristics and output characteristics, it can be used suitably in uses requiring a high output, specifically as a power source for driving battery-type electric vehicles and electric tools, for example.

The invention claimed is:

1. A positive electrode active material for a non-aqueous electrolyte secondary battery, comprising a powder of a lithium nickel composite oxide represented by the general formula:

$Li_{1-x}Na_xNi_{1-y}Me_yO_2$, where Me is at least one element selected from the group consisting of Co, Mn, Fe, Cu, Al, Mg, Ti, Zr, Ce, and Y, $0<x\leqq0.05$, and $0\leqq y\leqq0.34$, said positive electrode active material including primary particles having a median diameter of 3 μm or more and 13 μm or less, and said powder having a volume resistivity of 20 Ω·cm or more and 100 Ω·cm or less when said powder has a bulk density of 3 g/cm³.

2. The positive electrode active material for a non-aqueous electrolyte secondary battery in accordance with claim 1, wherein said lithium nickel composite oxide has primary particles having a shape of a polygonal plate.

3. The positive electrode active material for a non-aqueous electrolyte secondary battery in accordance with claim 1, wherein said lithium nickel composite oxide does not form substantially secondary particles.

4. The positive electrode active material for a non-aqueous electrolyte secondary battery in accordance with claim 1, wherein said lithium nickel composite oxide has a BET specific surface area of 0.3 m²/g or more and 0.8 m²/g or less.

5. A positive electrode for a non-aqueous electrolyte secondary battery comprising:
a positive electrode current collector; and
a positive electrode active material layer formed on a surface of said positive electrode current collector,
wherein said positive electrode active material layer includes the lithium nickel composite oxide in accordance with claim 1.

6. A non-aqueous electrolyte secondary battery comprising:
an electrode group including the positive electrode in accordance with claim 5, a negative electrode including a negative electrode active material capable of absorbing and desorbing lithium, and a separator that separates said positive electrode from said negative electrode;
a non-aqueous electrolyte; and
a battery case for housing said electrode group and said non aqueous electrolyte.

7. A battery-type electric vehicle comprising a vehicle and a prime mover for driving said vehicle,
wherein said prime mover includes an electric motor driven at least by a secondary battery, and
said secondary battery includes the non-aqueous electrolyte secondary battery in accordance with claim 6.

8. An electric tool comprising a driven portion and an electric motor for driving said driven portion, said electric motor driven at least by a secondary battery,
wherein said secondary battery includes the non-aqueous electrolyte secondary battery in accordance with claim 6.

* * * * *